Oct. 6, 1970     L. W. TOBIN, JR     3,532,267
TIME BASE ANALOGUE COMPUTER WITH NAVIGATION APPLICATIONS
Filed April 26, 1967     5 Sheets-Sheet 2

INVENTOR
LEO W. TOBIN JR.

BY Whittemore, Hulbert & Belknap

ATTORNEYS

Oct. 6, 1970     L. W. TOBIN, JR     3,532,267
TIME BASE ANALOGUE COMPUTER WITH NAVIGATION APPLICATIONS
Filed April 26, 1967     5 Sheets-Sheet 3
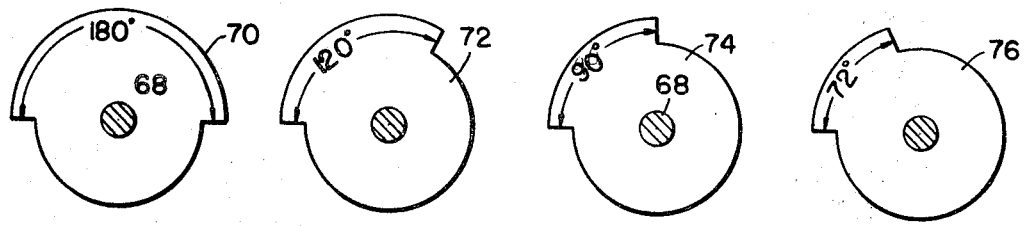
FIG. 3
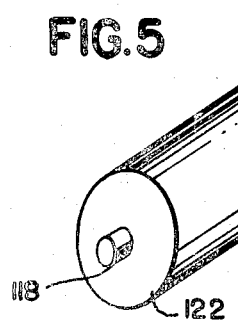
FIG. 5
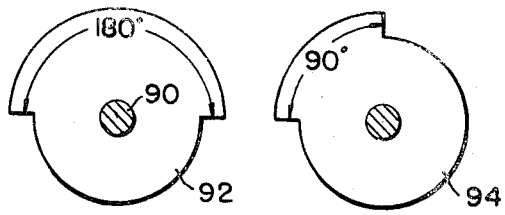
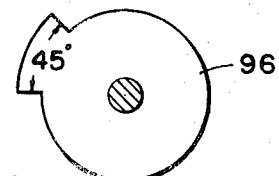
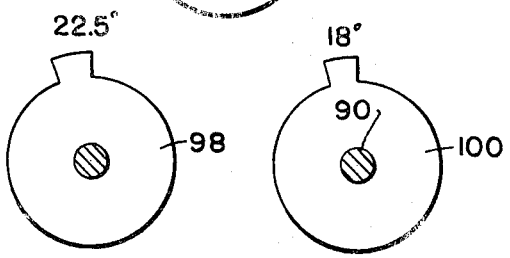
FIG. 4
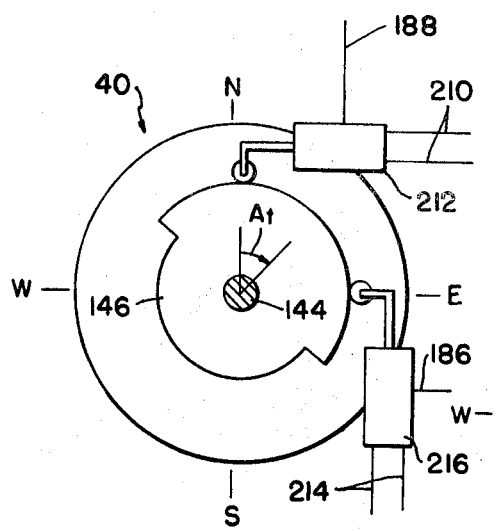
FIG. 8
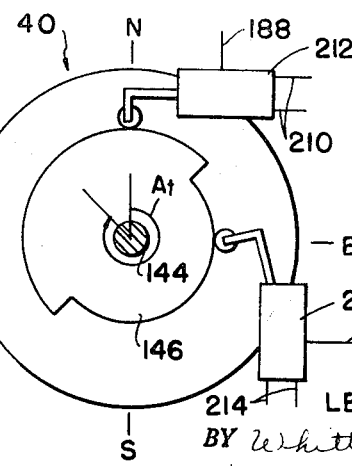
FIG. 9
INVENTOR.
LEO W. TOBIN JR.
BY Whittemore,
Hulbert & Belknap
ATTORNEYS

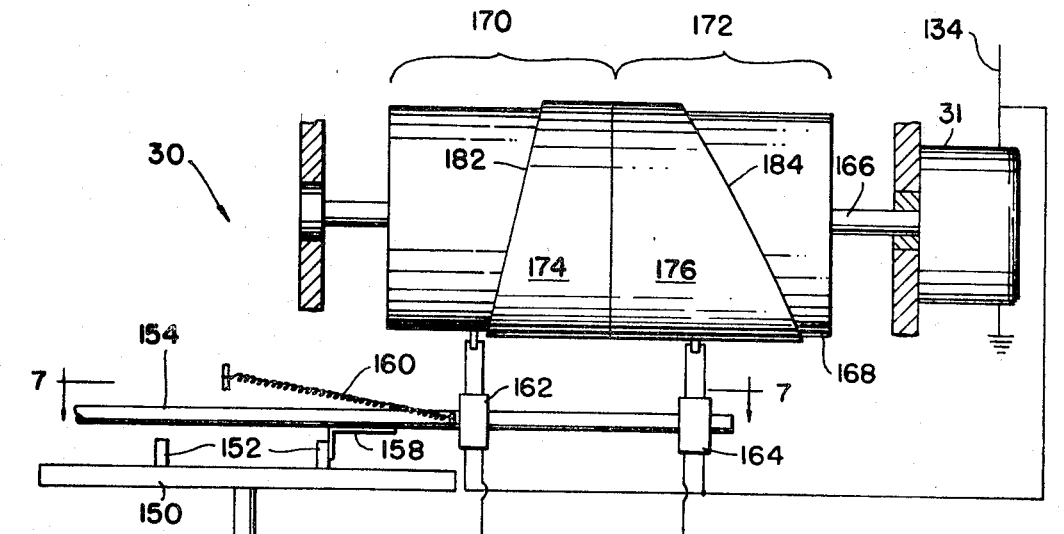
FIG. 6
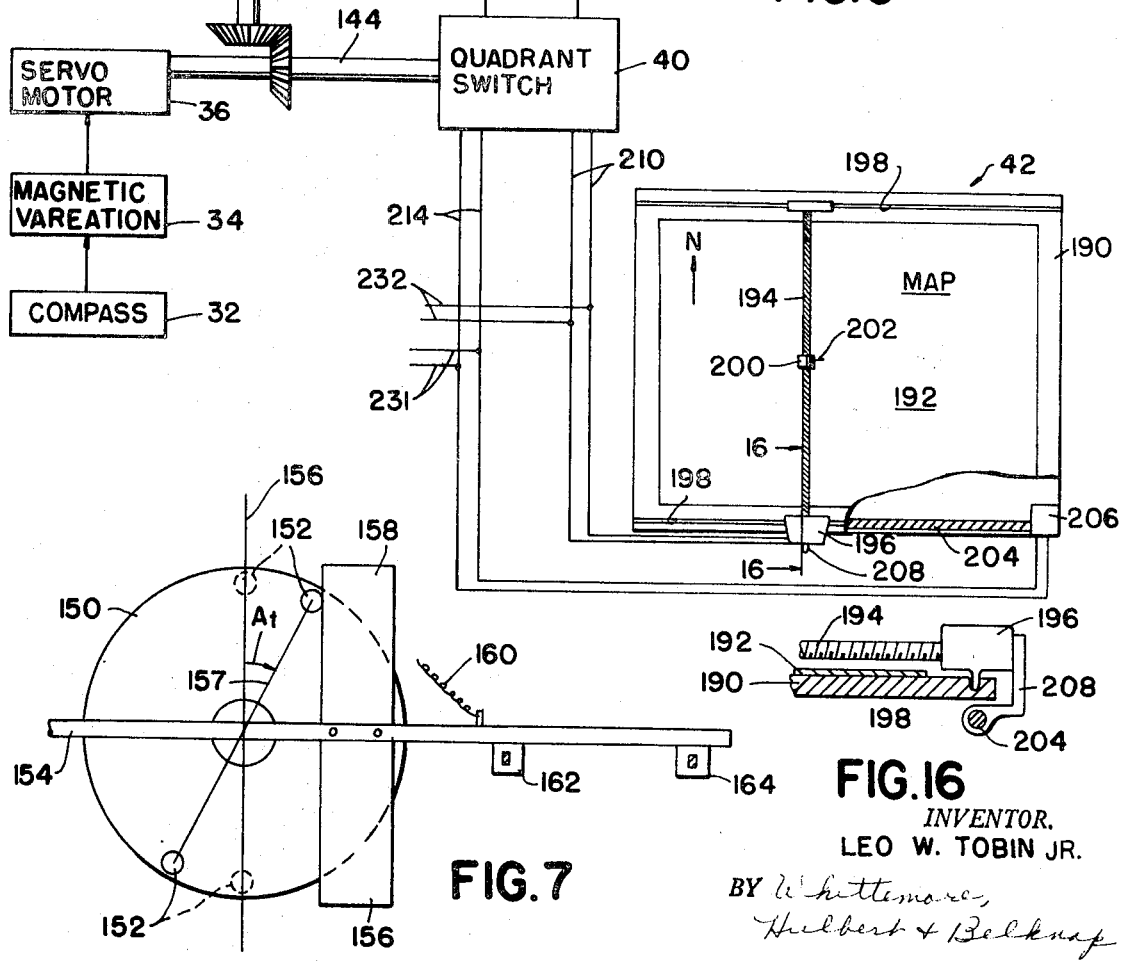
FIG. 7
FIG. 16
INVENTOR.
LEO W. TOBIN JR.
BY Whittemore,
Hulbert & Belknap
ATTORNEYS Oct. 6, 1970     L. W. TOBIN, JR     3,532,267
TIME BASE ANALOGUE COMPUTER WITH NAVIGATION APPLICATIONS
Filed April 26, 1967     5 Sheets-Sheet 5
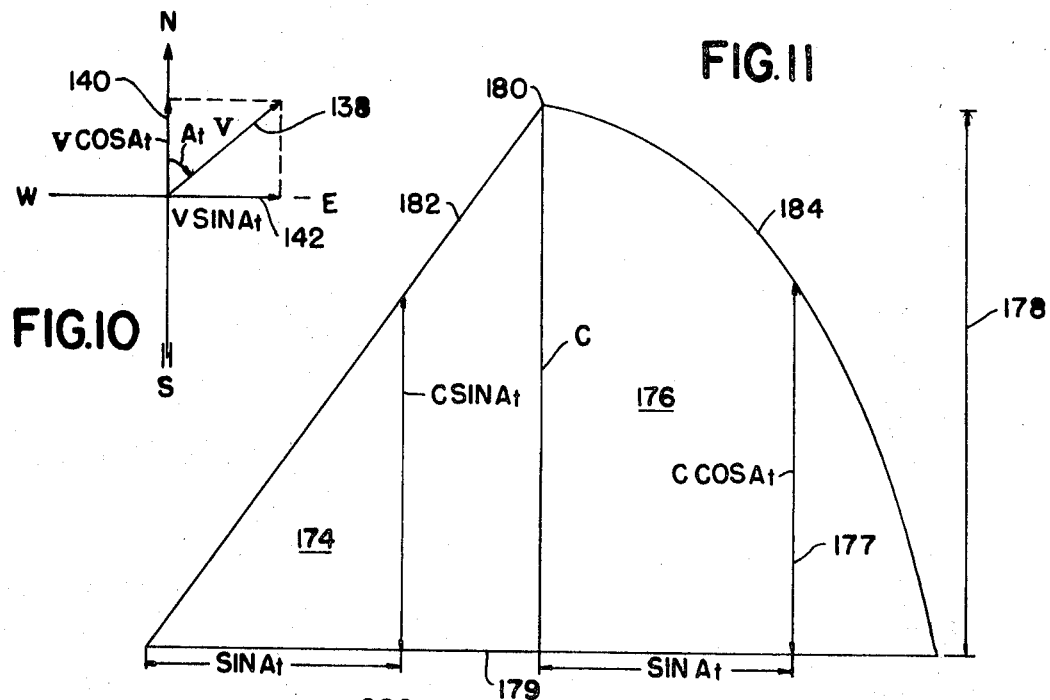
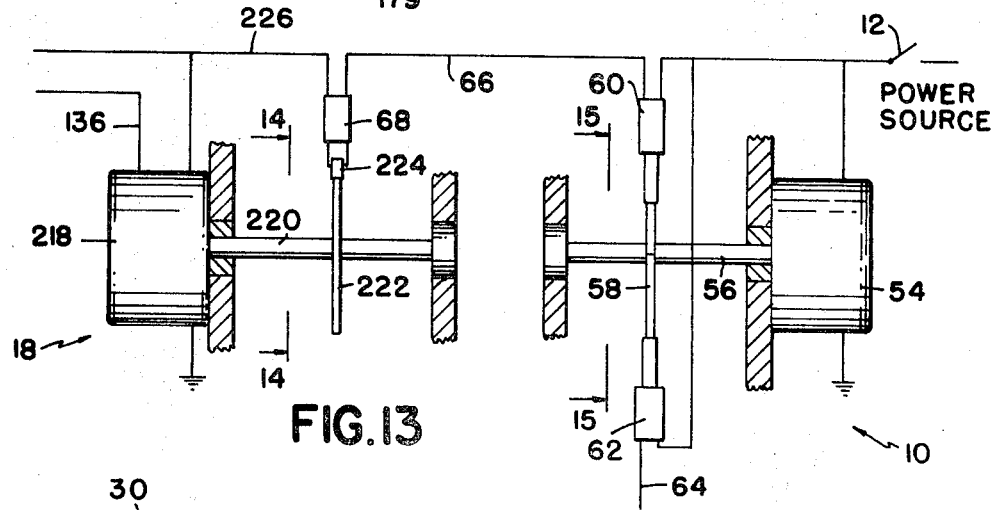
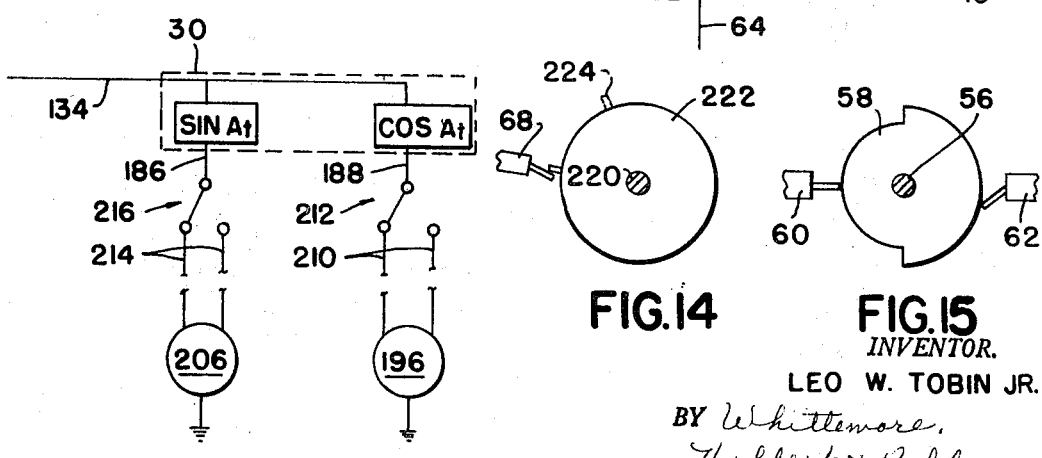
INVENTOR.
LEO W. TOBIN JR.
BY Whittemore,
Hulbert & Belknap
ATTORNEYS United States Patent Office 3,532,267
Patented Oct. 6, 1970

3,532,267
TIME BASE ANALOGUE COMPUTER WITH NAVIGATION APPLICATIONS
Leo W. Tobin, Jr., P.O. Box 323, Penllyn, Pa. 19458
Filed Apr. 26, 1967, Ser. No. 633,939
Int. Cl. G01c *1/00;* G06f *15/50;* G06g *7/78*
U.S. Cl. 235—61                                  41 Claims

ABSTRACT OF THE DISCLOSURE

The disclosure relates to a navigation computer for automatically plotting the position of a moving vehicle, such as an airplane or a boat, on a map as a function of the magnitude and direction of vehicle velocity and drift velocity. A time base analogue computer scales the time duration of an input voltage signal to form output pulses having durations the average of which is proportional to the scale of the map on which the vehicle position is to be plotted. These pulses are then alternately proportioned in duration to the magnitude of vehicle velocity through the air or water and to the magnitude of drift velocity over the earth's surface due to wind or current. The proportioned velocity and drift pulses are resolved into north-south and east-west pulse components having durations proportional to the north-south and east-west vehicle velocity and drift velocity. The resolved pulses power north-south and east-west drive motors on the plotting board to plot the vehicle position on the map.

BACKGROUND OF THE INVENTION

The field of invention is time base analogue computers and particularly a time base analogue computer for navigational use for plotting the position of a moving body.

SUMMARY

The invention relates to a navigation computer of the analogue type for plotting the position of a moving vehicle, such as an airplane or a boat, on a map or chart. The computer operates on a time base principle whereby when an unscaled input signal is used to power drive motors on the plotting board the maximum rate of vehicle excursion over the plotting board is attained. By passing this maximum signal through a series of proportioners, each of which reduces the duration of the signal supplied to the plotting motors in proportion to an input variable determined by the function and setting of the proportioner, and by properly interconnecting the timed proportioners, the required mathematical operations are performed on the input signal so that the reduced output signal is proportional in duration to vehicle speed and the plotting motors are driven for periods of time sufficient to plot the position of the vehicle on the map or chart.

By the use of a time base pulse computer it is possible to provide an inexpensive, yet reliable, navigation computer having a relatively simple electro-mechanical operation which achieves a degree of accuracy sufficiently high to permit accurate vehicle navigation. The navigation computer plots the change in position of the vehicle on a map and traces vehicle movement across the map from inputs which are determined by the vehicle heading and velocity and the effect of wind or current drift.

While the preferred embodiment of the invention relates to a navigation computer, it is obvious that the time base computer as disclosed may be useful in any number of applications aside from the field of navigation and represents a departure from the conventional analogue computer where the input is measured in terms of a voltage or shaft position, rather than in terms of an interval of time.

A primary object of the invention is to provide a new and improved navigation computer for use in plotting the position of a moving vehicle.

Another object of the invention is to provide a novel time base analogue computer useful for computing the position of a moving vehicle.

A further object of the invention is to provide an inexpensive yet reliable analogue time base computer.

Other objects and features of the invention will become apparent as the description proceeds, especially when taken in conjunction with the accompanying drawings, illustrating a preferred embodiment of the invention, wherein:

FIG. 1 diagrammatically illustrates a navigation computer according to the invention;

FIGS. 3 and 4 show the cams used in the scale-computer multiplier and scale computer units shown in FIG. 2;

FIG. 5 is a perspective view of the cylindrical cam of the vehicle velocity computer of FIG. 2 showing the generation of the linear cam surface;

FIG. 6 is a partially diagrammatic view of another portion of the computer illustrated in FIG. 1 showing the Scotch yoke drive, the sine-cosine cam and switch and the plotting board in detail;

FIG. 7 is a top view of the Scotch yoke drive taken along line 7—7 of FIG. 6;

FIGS. 8 and 9 are views illustrating the operation of the quadrant switch shown in FIG. 6;

FIG. 10 illustrates the resolution of the vehicle velocity vector into north-south and east-west components;

FIG. 11 illustrates the flattened cam surfaces which are wrapped around the cylindrical cam body of the sine-cosine cam to actuate the switches shown in FIG. 6;

FIG. 12 is a diagrammatic view of the circuitry associated with the quadrant switch as shown in FIGS. 8 and 9;

FIG. 13 shows the cycling circuit and storage circuit of FIG. 1;

FIGS. 14 and 15 are sectional views taken respectively along lines 14—14 and 15—15 of FIG. 13; and FIG. 16 is a sectional view taken along line 16—16 of FIG. 6.

Figure 1:
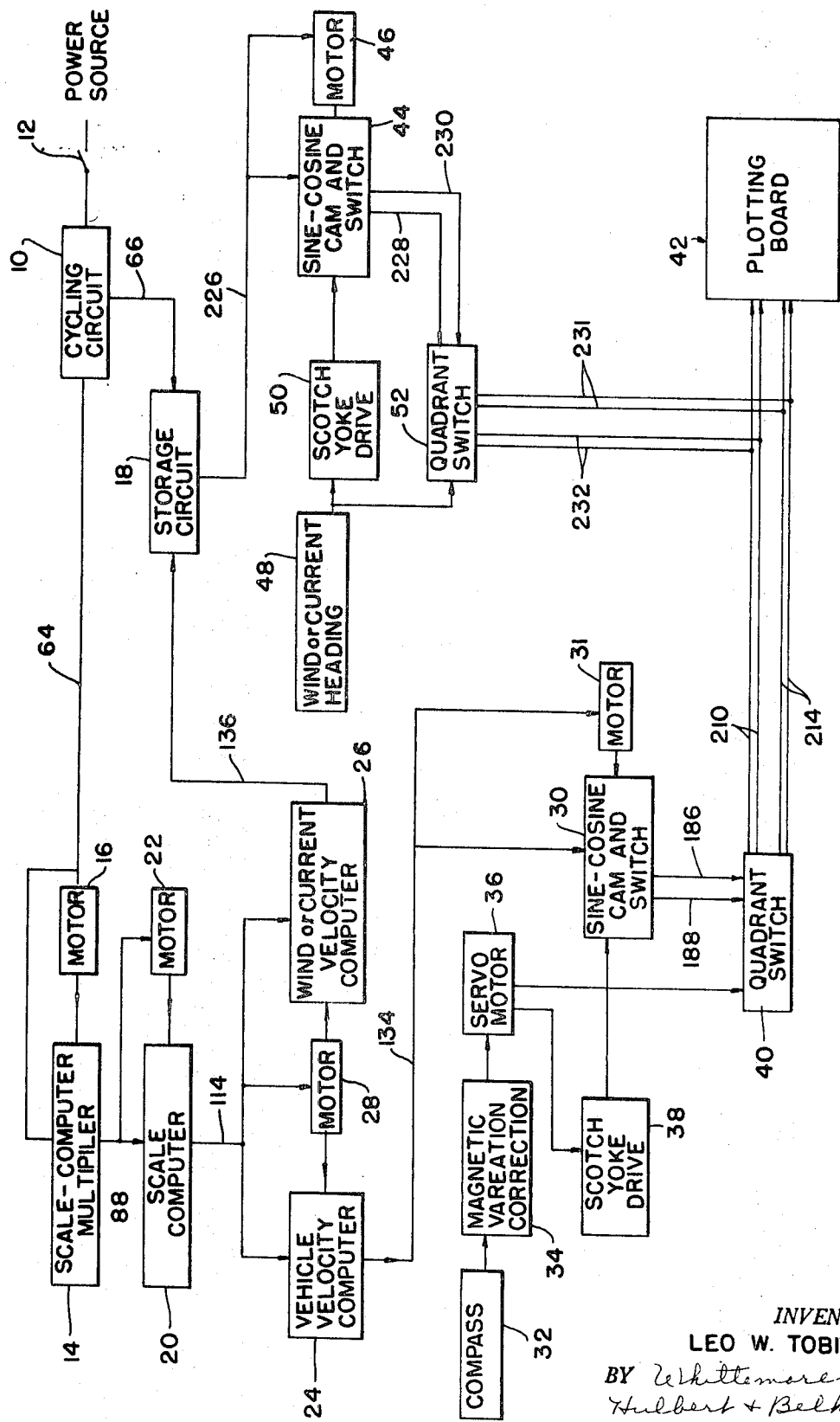

In the computer as shown in FIG. 1 a repetitive cycling circuit 10 is connected to a source of electric power through on-off switch 12. During one-half of the cycle of circuit 10 power is supplied to the scale-computer multiplier 14 and the electric motor 16 is energized. During the other half of the cycle of circuit 10 power is supplied to the storage circuit 18. The output pulse from the scale-computer multiplier 14 is fed to scale computer 20 and also to the scale computer motor 22. The output pulse from the scale computer 20 is fed to the vehicle velocity computer 24, wind or current velocity computer 26, and also to motor 28. The output from the vehicle velocity computer is fed to the sine-cosine cam and switch 30 and motor 31. Motor 31 rotates the cam element of the sine-cosine cam and switch 30.

The magnetic bearing of the vehicle motion as determined by compass 32 is corrected for magnetic variation at 34 and positions the shaft of servo motor 36 to true bearing to orient Scotch yoke drive 38 and the cam for quadrant switch 40. The sine-cosine cam and switch 30 resolves the output pulse from the vehicle velocity computer 24 into north-south and east-west pulse components as determined by the vehicle true bearing. The orientation of the cam for quadrant switch 40 is determined by the true bearing of the vehicle so that the pulse outputs of the sine-cosine cam and switch 30 are suitably switched to the plotting board 42 to actuate the north-south and east-west plotting motors in the appropriate direction of rotation so that the velocity or non-drift movement of the vehicle is plotted on the plotting board.

During he half cycle of circuit 10, when the scale-computer multiplier 14 and motor 16 are actuated, the output pulse from the wind or current velocity computer 26 is stored in the storage circuit 18, so that during the following half of the cycle of circuit 10 the storage circuit 18 is provided with power to read out a signal pulse of duration equal to that originally fed from the wind velocity computer 26 into the storage circuit 18. This output pulse is fed through sine-cosine cam and switch 44 and to related motor 46. The positions of the Scotch yoke drive 50 and quadrant cam for switch 52 are determined bythe wind or current heading input 48 so that the sine-cosine cam and switch 44 resolves the wind or current velocity output pulse received from the storage circuit 18 into north-south and east-west pulse components during the half of the cycle of circuit 10 when the storage circuit 18 is actuated for read out. The output pulses of quadrant switch 52 drive the plotting motors of board 42 so as to accurately plot the motion of the vehicle due to the effect of wind or current with respect to the earth.

In the preparation of the navigation computer shown in FIG. 1 the plotting board pointer is driven during one-half of the cycle of circuit 10 to plot the non-drift or velocity motion of the vehicle, and the pointer is driven during the other half of the cycle of circuit 10 to plot the motion of the vehicle over the earth due only to wind or current effects on the vehicle. The total vector movement of the vehicle plotting pointer on the plotting board 42 at the end of one cycle of circuit 10 reflects the total motion of the vehicle over the earth during the cycle.

In the computer all the drive motors 16, 22, 28, 31 and 46 are of the constant speed type and preferably all rotate at the same speed. Thus when each of these motors is actuated by a power pulse of a given duration, the drive shaft of each motor will be rotated through the same angle.

Considering the computer now in further detail as shown in FIGS. 2 through 16, the cycling circuit 10 of FIGS. 13 and 15 includes a drive motor 54 which is turned on when the switch 12 is closed. Motor 54 rotates a shaft 56 carrying a 180° lobed cam 58 thereon. Diametrally spaced switches 60 and 62 are connected to the power source through switch 12 and are turned on or off alternately by the lobe of the cam 58. Each switch is on during one-half of each revolution of cam 58 while during this time the other switch is turned off.

Output lead 64 from switch 62 is connected to the scale-computer multiplier 14 and to the drive motor 16. Output lead 66 from switch 60 is connected to a switch 68 in the storage circuit 18. When the computer is turned on to energize the motor 54, power is supplied to the scale computer multiplier 14 for a period of time during which the storage circuit is turned off and at the end of this period the storage circuit is turned on for an equal period of time during which the scale-computer multiplier 14 is turned off. During continued operation of the computer the cycling circuit 10 alternately energizes the two computer elements 14 and 18.

The scale-computer multiplier motor 16 rotates shaft 68 and the came 70, 72, 74 and 76 thereon at a uniform rate of speed. As shown in FIG. 3, cam 70 has a 180° lobe, cam 72 has a 120° lobe, came 74 has a 90° lobe, and cam 76 has a 72° lobe. On-off switches 78, 80, 82 and 84 are positioned adjacent cames 70, 72, 74 and 76 respectively so that each switch is turned on by the lobe of its respective cam. Thus switch 78 will be turned on during one-half of the period of revolution of shaft 68, switch 80 will be turned on during one-third of the period of revolution of the shaft, switch 82 will be turned on during one-fourth of the period of revolution of the shaft, and switch 84 will be turned on during one-fifth of the period of revolution of the shaft.

Figure 2:
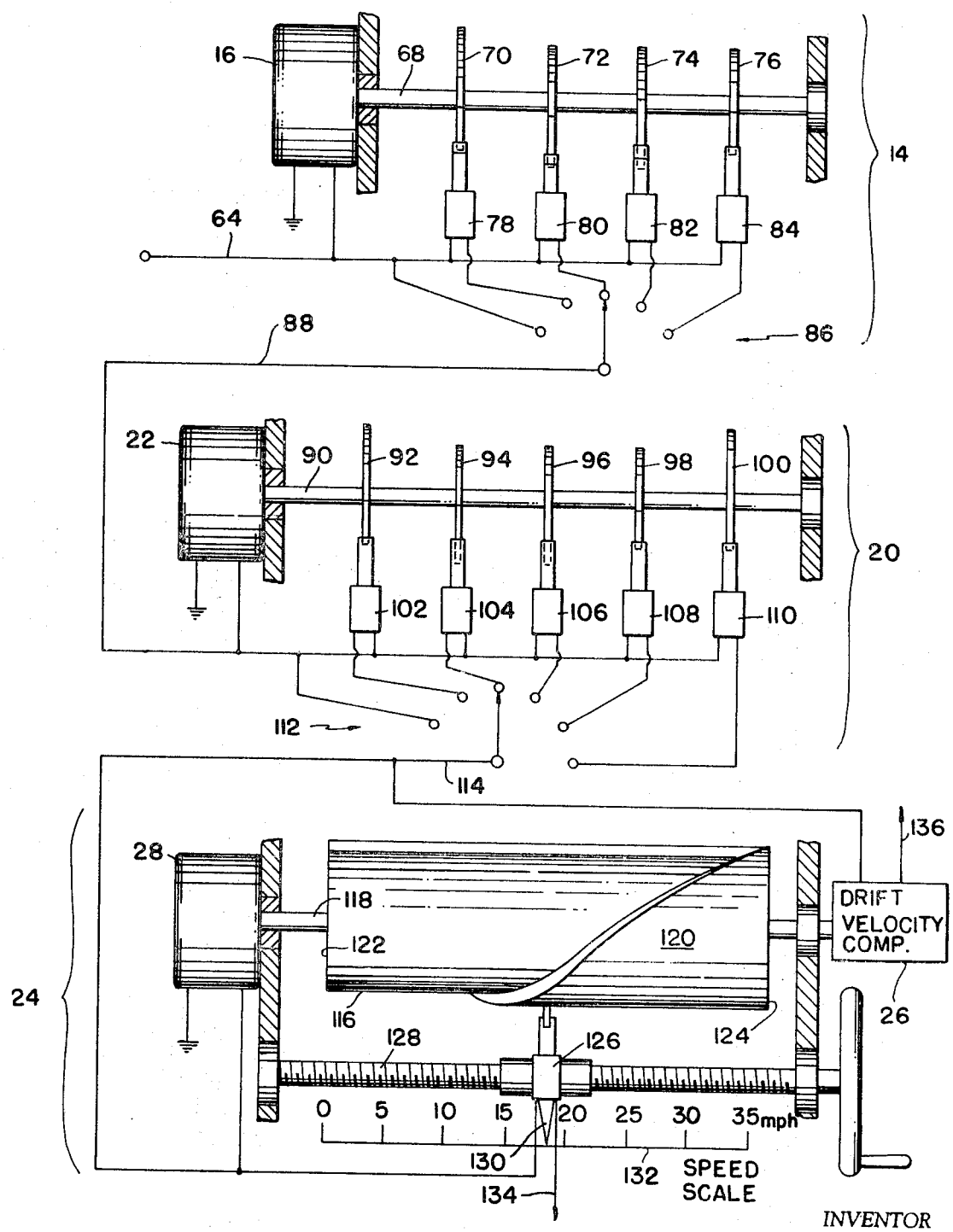
FIG. 2 illustrates the scale-computer multiplier, scale computer and vehicle velocity computer units indicated in FIG. 1.

One side of each of the switches 78, 80, 82 and 84 is connected to the lead wire 64 and the other side of each of the switches is brought to a contact of a manually operable scale-selector switch 86. Lead 64 is connected directly to one contact of the switch. The 360° cycle of circuit 10 is greater than the period of revolution of shaft 68 so that by selectively positioning switch 86 the output lead 88 connecting switch 86 to scale computer 20 and motor 22 is energized for all of, one-half of, one-third of, one-fourth of, or one-fifth of the time the lead connection 64 is energized. When the switch 86 is positioned as shown in FIG. 2, the leads 64 and 88 are connected through switch 80 so that the lead 88 is energized during one-third of the time the lead 64 is energized.

The scale computer 20 includes a rotatable shaft 90 driven by motor 22. The shaft 90 carries cams 92, 94, 96, 98 and 100 which, as shown in FIG. 4, have lobes of 180°, 90°, 45°, 22½°, and 18° duration respectively. Switches 102, 104, 106, 108 and 110 are associated with cams 92, 94, 96, 98 and 100 respectively so that the switch 102 is on during one-half of each revolution of shaft 90, switch 104 is on during one-fourth of each revolution of the shaft, switch 106 is on during one-eighth of each revolution of the shaft, switch 108 is on during one-sixteenth of each revolution of the shaft, and switch 110 is on during one-twentieth of each revolution of the shaft. One side of each switch is connected to lead 88 and the other side of each switch is connected to one of the contacts of manually operable scale selector switch 112. Lead 88 is directly connected to one contact of switch 112.

The output of scale computer 20 is supplied to the vehicle velocity computer 24, drive motor 28, and the wind or current velocity computer 26 by lead 114 so that these components are energized for a period of time equal to either the entire time the lead 88 is energized, one-half of such time, one-fourth of such time, one-eighth of such time, one-sixteenth of such time, or one-twentieth of such time, dependent upon the position of the switch 112. With the switch 112 positioned as shown in FIG. 2, the vehicle velocity and wind or current velocity computers 24 and 26 and motor 28 are energized for one-fourth of the time the lead 88 is energized.

The vehicle velocity computer 24 comprises a cylindrical cam 116 mounted on shaft 118 and rotated by motor 28. The raised cam surface 120 of cam 116 linearly increases in circumferential extent from 0° at end 122 of the cam to 360° at end 124 of the cam. As illustrated in FIG. 5, the cam surface 120 may be formed by wrapping a right triangle around the cylindrical cam 116, the triangle having a base equal to the length of the cylinder, a height equal to the circumference of the cylinder, and a thickness equal to the lobe thickness.

On-off switch 126 is threadably mounted on manually rotatable lead screw 128 and carries a pointer 130 so that by rotating the screw 128 the switch 126 may be positioned relative to the vehicle speed scale 132 to accurately reflect the driven or non-drift speed of the vehicle. While FIG. 2 discloses means for manually adjusting the position of the switch 126 to correspond to the vehicle speed, it is contemplated that this adjustment could be performed through automatically operable means without the necessity of manually positioning the switch. Lead connection 114 from the scale computer 20 is connected to motor 28 and to one side of the switch 126. The other side of the switch 126 is connected to a lead connection 134 which leads to the sine-cosine cam and switch 30 and to motor 31.

In the embodiment of the invention here described the linear speed scale 132 of the vehicle velocity computer 24 is graduated from 0 miles per hour adjacent end 122 of cam 116 to 35 miles per hour adjacent end 124 of the cam. The invention is obviously capable of use for plotting the position of vehicles moving at speeds far greater than 35 miles per hour, so that it is understood that reference to the 0 to 35 miles per hour scale is made for purposes of describing the preferred embodiment and does not limit the invention. The trigger of switch 126 is positioned adjacent the surface of the cam so that when it rides up on the cam surface 120 the switch 126 is turned on. Thus with the switch positioned in the 35 miles per hour position, it will be on during the entire revolution of the cam 116 and with the switch positioned in the 0 mile per hour position the switch will be off during the entire period of revolution of the cam. The cam and switch arrangement in the vehicle velocity computer provides a continuously variable time divider in contrast to the discrete time dividers of the type used in the scale-computer multiplier 14 and the scale computer 20.

When lead connection 114 is energized through scale computers 14 and 20, the motor 28 is turned on and rotates shaft 118 and cam 116. The lead 134 is energized for a portion of the time the lead 114 is energized equal to the ratio of the set scale speed or vehicle speed to the maximum scale speed, in this case 35 miles per hour. For example, when the set scale speed is 15 miles per hour, the lead connection 134 will be actuated for $15/35$ or $3/7$ of the time the lead connection 114 is actuated.

The lead connection 114 also connects the output of switch 112 to the wind or current velocity computer 26 which comprises a continuously adjustable input pulse divider like the vehicle velocity computer. Motor 28 rotates the cam of the wind or current velocity computer 26 as well as the cam of the vehicle velocity computer 24. In adjusting the wind or current velocity computer the pointer carried by the on-off switch, comparable to switch 126 in computer 24, is set at a speed equal to the velocity of the wind or current to which the vehicle is subjected. Input lead 114 is connected to one side of the on-off switch in the wind or current velocity computer and the other side of this switch is connected to the storage circuit 18 through lead 136 so that the storage circuit will be actuated through this lead for a portion of the time the lead 114 is actuated directly dependent upon the magnitude of the vehicle wind or current velocity. The vehicle wind or current velocity may be due to wind, current or other force acting on the vehicle, and acts on the vehicle at an angle or bearing independent of the direction of travel or bearing of the vehicle.

As indicated in FIG. 10, the vehicle velocity vector 138 has a magnitude V and has a true bearing $A_t$ relative to true north. This vector may be resolved into north-south and east-west components 140 and 142 which respectively have values equal to V cosine $A_t$ and V sine $A_t$. The magnetic bearing of the vehicle as determined by the compass 32 of FIG. 6 is corrected for magnetic variation at 23 to determine the true vehicle bearing $A_t$. The bearing $A_t$ is supplied to servo motor 36 (FIG. 6) which rotates shaft 144 so that the angular shaft position is determined by bearing $A_t$. The 180° cam 146 (FIG. 8) in quadrant switch 40 is carried by shaft 144 and is rotated to a position corresponding to the bearing $A_t$ of the vehicle as indicated in FIGS. 8 and 9. Shaft 148 is geared to shaft 144 through 1:1 bevel gears so that the angular position of the shaft 148 corresponds to the true bearing of the vehicle. Scotch yoke drive disc 150 is mounted on upper end of shaft 148 and is provided with a pair of diametrally opposed sine pins 152.

When the vehicle is headed either north or south, that is, with the bearing $A_t$ equal to either 0° or 180°, the sine pins 152 are positioned as shown in dotted lines in FIG. 7 and lie along a line 156 perpendicular to the axis of the slide sine bar 154. Bar 154 is slidably confined so that it is free to move only along its axis in a direction perpendicular to line 156. The disc 150 is rotated to reflect the bearing $A_t$ of the vehicle so that the angle between the line 157 joining pins 152 and the transverse line 156 is equal to the vehicle bearing $A_t$.

A laterally extending T-member 158 is secured to slide bar 154 and extends at right angles to either side thereof a distance greater than the radius of the disc 150. Spring 160 is attached to bar 154 and biases the member 158 against at least one of the pins 152 so that the axial position or throw of the bar 154 is directly proportional to sine $A_t$. On-off switches 162 and 164 are secured to the free end of bar 154 and are spaced apart by a distance equal to the maximum throw of the bar.

Lead connection 134 (FIG. 6) is connected to drive motor 31 and also to one side of each of the switches 162 and 164. The motor 31 rotates a shaft 166 which carries a cylindrical cam body 168 having a circumference C and a height equal to twice the maximum throw of bar 154. The cam body 168 is made up of two cams 170 and 172 which are used to actuate switches 162 and 164 respectively. The cams 170 and 172 each have a raised cam surface 174 and 176 which is wrapped around the surface of the cam body 168. Cams 170 and 172 each have a cylindrical height equal to the throw of the bar switches 162 and 164 are positioned adjacent the left hand ends of the cams 170 and 172 as seen in FIG. 6. When the vehicle has a bearing of 90° or 270°, the the switches 162 and 164 are positioned adjacent the right hand ends of the cams 170 and 172.

The flattened configuration of the raised cam surfaces 174 and 176 which are wrapped around the cam body 168 to form cams 170 and 172 in shown in FIG. 11 in order to simplify the description of the cams. Each of the cam surfaces 174 and 176 has a height 178 equal to the circumference C of the cam body 168 so that when the cam surfaces are wrapped around the cam body, the apex 180 thereof is positioned against the base 179 of the cam surfaces. The flattened cam surface 174 has a shape of a right triangle with the base having a length equal to the throw of bar 154 and an altitude equal to the circumference C of the cam body 168. The hypotenuse edge 182 of the cam surface 174 begins at one end of the cam 170 and forms a complete spiral therearound to end at the other end of the cam. The raised cam surface 176 has an altitude and base equal to those of the cam surface 174. The third edge of the cam surface 176 however is curved outwardly away from the base and altitude of the surface as indicated in FIG. 11. This edge is obtained by plotting cosine $A_t$, the height of the triangle, against sine $A_t$, the base of the triangle.

When the cam body 168 is rotated by motor 31, the switch 162 will be turned on as it traverses the raised cam surface 174. The portion of the period of revolution of the cam body 168 during which the switch 162 is turned on is equal to sine $A_t$ since, as illustrated best in FIG. 11, the trigger of switch 162 is positioned from the left hand end of the cam surface 174 a distance directly proportional to sine $A_t$ as determined from the angular positioning of the Scotch yoke drive disc 150. The switch 162 is then held in the on position during the time required to rotate the cam 170 a circumferential distance equal to C sine $A_t$ past the switch. The total circumferential distance rotated in one revolution of the cam body 168 is C so that the portion of the time during each revolution of the cam body when the switch 162 is on is equal to C sine $A/C$ or sine $A_t$.

The position of the switch 164 to the right of the left hand edge of the cam 172 is also directly proportional to sine $A_t$. For a given position along the base of the surface 176 the height 177 of the cam surfaces is equal to C cosine $A_t$. During each revolution of the cam body 168 the switch 164 is held on while the body rotates a circumferential distance equal to C cosine $A_t$ so that the portion of the time during each revolution when the switch is on is equal to cosine $A_t$.

Since the cams 170 and 172 are rotated only during the period of time when the lead connection 134 is energized, the output lead connection 186 leading from switch 162 to the quadrant switch 40 is energized for a period of time equal to the time of energization of the lead 134 multiplied by sine $A_t$. Likewise, the output lead-connection 188 which connects switch 164 to the quadrant switch 40 is energized for a period of time equal to the period of time during which lead 134 is energized multiplied by cosine $A_t$. The servo motor 36 is responsive to change in the bearing $A_t$ and rotates shafts 144 and 148 in response to an alternation of $A_t$ so that the switches 162 and 164 are appropriately moved relative to the cams 170 and 172 to assure that the periods of time during which the output leads 186 and 188 are energized are equal to the time the lead 134 is energized multiplied by the sine $A_t$ and cosine $A_t$ respectively.

The plotting board 42 shown in FIG. 6 comprises a map or chart table 190 on top of which is laid a map 192 showing the area being traversed by the vehicle. North-south oriented lead screw 194 and reversible drive motor 196 are mounted on the table 190 in grooves 198 (FIG. 16) so that the lead screw and motor are free to move in an east-west direction across the map. Indicator 200 carrying pointer 202 is threadedly engaged on the lead screw 194 so that when the lead screw is rotated by the motor 196, the pointer 202 is moved either in a northerly or southerly direction relative to the map dependent upon the direction of rotation of the motor.

East-west oriented lead screw 204 is mounted beneath the lower edge of the map table 190 and is rotated by reversible drive motor 206. Arm 208 on motor 196 extends around the edge of the table 190 and is threadedly engaged to lead screw 204 so that upon rotation of the lead screw 204 the pointer 202 is moved across the map 192 in an east-west direction dependent upon the direction of rotation of the motor 206.

Motor 196 is energized through either of leads 210 which are connected to the outputs of double throw switch 212 in the quadrant switch 40, illustrated in FIGS. 8 and 9. Leads 214 for motor 206 are connected to the outputs of double throw switch 216 in the quadrant switch 40. Leads 186 and 188 from the switch 30 are connected to the inputs of switches 216 and 212 respectively.

The direction of rotation of the two motors 196 and 206 is determined by the positions of the switches 212 and 216. When the vehicle has a bearing $A_t$ lying in the northeast quadrant, as shown in FIGS. 8 and 10, the triggers of switches 212 and 214 both ride on the 180° lobe of cam 146 and the drive motors 196 and 206 are thereby actuated through the appropriate connecting leads 210 and 214 so that motor 196 rotates the lead screw 194 to move pointer 202 in a northerly direction and motor 206 rotates the lead screw 204 to move pointer 202 in an easterly direction. As shown in FIG. 9, when the bearing $A_t$ of the vehicle lies in the northwest quadrant, the switch 212 which governs the direction of rotation of motor 196 is in the same position as in FIG. 8 so that the motor 196 will rotate in the same direction and pointer 202 will move in a northerly direction. With a bearing $A_t$ in the northwest quadrant, however, the trigger of switch 216 has fallen from the lobe of cam 146 so that the direction of rotation of the motor 206 is reversed. The pointer 202 will then be moved in a westerly direction so that the vector resolution of the northerly and westerly motions of the pointer 202 lies in the northwest quadrant. Servo motor 36 rotates the cam 146 to correctly reflect the true bearing of the vehicle so that the switches 212 and 216 will assure that the drive motors 196 and 206 rotate in the appropriate direction for a given vehicle heading $A_t$.

Lead 136 which connects the output of the wind or current velocity computer 26 to timing motor 218 is energized for a period of time depending upon the setting of the wind or current velocity computer 26 and the settings of the two scale computers 14 and 20. As with the setting of the vehicle velocity computer, it is contemplated that automatic setting means may be provided to provide a wind or current velocity input to computer 26. During the period of time the lead connection 136 is energized the timing motor 218 rotates shaft 220 and cam 222 carried thereon in a clockwise direction as shown in FIG. 14. At the beginning of the output pulse from computer 26 the stop 224 on cam 222 is in the rest position and holds the trigger of switch 68 in the off position. As the cam 222 is rotated clockwise the stop is moved away from the switch 68 so that it is closed and the stop 224 is rotated away from the trigger. When the period during which the lead connection 136 is actuated ends, the motor 218 is turned off and the movement of the cam 222 is stopped. Stop 224 may then be in position as shown in dotted lines FIG. 14 and switch 68 is turned on.

When the first half of the timing cycle of circuit 10 is completed, the switch 62 is turned off and switch 60 is turned on to permit power to flow through lead connection 66, closed switch 68, and lead connection 226 to drive motor 218 in a counterclockwise direction and rotate the stop 224 back toward the trigger of switch 68. During this time the motor 46 and sine-cosine cam and switch 44, which are identical to the sine-cosine cam and switch 30 and motor 31 described previously, are provided with power. The motor 218 runs at the same rate of speed in both directions so that the period of time required to rotate the stop 224 back into engagement with the trigger of switch 68 so as to turn the switch off is of the same duration as the output pulse from the wind or current velocity computer 26. In this way a pulse having a duration equal to the duration of the output pulse from the wind or current velocity computer 26 is supplied to the sine-cosine cam and switch 44 and motor 46 during the second half of the cycle of circuit 10. The length of this pulse is proportional to the wind or current velocity multiplied by scale factors.

The direction of wind or current velocity having a bearing $A_w$ is either manually or automatically determined by wind or current heading means 48 which accordingly rotates the Scotch yoke drive disc of drive 50 to a proper position. The sine bar of drive 50 positions the two switches of the sine-cosine cam and switch 44 relative to the cam body of switch 44 so that the lead connection 228 is energized for a period of time equal to the period of time the lead 226 is energized multiplied by sine $A_w$ and so that the period of time the connection 230 is energized is equal to the period of time lead 226 is energized multiplied by cosine $A_w$.

The wind or current heading means 48 also positions the cam in quadrant switch 52 in relation to the wind or current bearing $A_w$. Lead connections 230 and 232 connect the output terminals of the two double throw switches in quadrant switch 52 to the analogous lead connections 210 and 214 so that the output pulses of the sine-cosine cam and switch 44 rotate the plotting board motors 196 and 206 in the appropriate directions. The movement of the pointer 202 across the map 192 alternately plots the movement of the vehicle during one-half cycle of circuit 10 in proportion to its velocity through the air or water or other medium. During the second half cycle the movement of the pointer plots the movement of the vehicle due entirely to wind or current effect.

From the foregoing description of the invention it is clear that during the first half of the cycle of circuit 10 the switch 62 is turned on so as to actuate the components on the left hand side of FIG. 1 whereby the pointer 202 is moved relative to the map 192 a vector distance which corresponds to the velocity motion of the vehicle through the air or water during the entire cycle of circuit 10.

During the second half of the cycle of circuit 10 the switch 60 is turned on and the circuitry shown generally to the right of FIG. 1 is actuated so that the pointer 202 is moved over the map 192 a vector distance reflecting the drift motion of the vehicle due to wind or current during the entire cycle of circuit 10. At the end of the cycle the position of the pointer 202 on the map will have moved a distance equal to the vector sum of the vehicle velocity and drift during the cycle.

The operation of the navigation computer will now be considered in greater detail. With each cycle of the circuit 10 a power pulse having a time interval equal to one-half the cycle of circuit 10 is supplied to the scale-computer multiplier 14 through lead 64. With switch 86 positioned to connect lead 64 directly to lead 88, and switch 112 positioned to connect lead 88 directly to lead 114, this cycling circuit pulse will pass undiminished in duration through both the scale-computer multiplier 14 and the scale computer 24 and will be supplied to both the vehicle velocity computer 24 and the wind or current velocity computer 26. When the switch 126 in the vehicle velocity computer 24 is moved to the 35 mile per hour or maximum speed position, the switch will be held in the on position at all times so that the full cycling circuit pulse forms the output of the vehicle velocity computer. The sine-cosine cam and switch 30 will resolve the output pulse from the vehicle velocity computer 24 into two pulses of duration directly proportional to the north-south and east-west components of the vehicle velocity. The quadrant switch 40 assures that the drive motors 196 and 206 are rotated in the proper directions according to the vehicle bearing $A_t$ so that the vector movement of pointer 202 is correctly oriented.

The north-south input pulse supplied to drive motor 196 will have a duration directly proportional to the velocity component of the vehicle in the north-south direction and the double throw switch 212 in quadrant switch 40 will be appropriately positioned by cam 146 so that the direction of rotation of the motor 196 will move pointer 202 in a northerly or southerly direction depending upon the vehicle bearing $A_t$. The movement of the pointer 202 in response to the actuation of motor 196 will trace the north-south component of movement of the vehicle during a period of time equal to the one cycle of circuit 10.

Likewise, movement of the pointer 202 across map 192 in response to the actuation of motor 206 will trace the east-west movement of the vehicle on the map corresponding to the east-west movement of the vehicle during the cycle of the circuit 10. The vector movement of pointer 202 over the map 192 in response to the output pulse of the vehicle velocity computer 24 as resolved by the sine-cosine cam and switch 30 and switched by the quadrant switch 40 plots the movement of the vehicle on the map during a time interval equal to the complete period of the cycling circuit when the vehicle is traveling at a speed of 35 miles per hour and at a given bearing $A_t$. With the switches 86 and 112 positioned to connect lead 64 to lead 88 and lead 88 to lead 114, the entire half cycle pulse is supplied to the vehicle and wind or current velocity computers 24 and 26 and the navigation computer will acurately trace the movement of the vehicle on a map 192 having a scale of 1:5000.

In the example just given the vehicle velocity computer 24 was set at a maximum vehicle speed of 35 miles per hour and the entire output pulse of the scale computer 20 was supplied to the sine-cosine cam and switch 30. When the vehicle velocity is 17½ miles per hour, the switch 126 is held on during one-half of each revolution of the cam 116 and the output pulse from the vehicle velocity computer 24 has a time duration equal to one-half of the 35-mile an hour output pulse. Accordingly, the pointer 202 will be moved a distance across the map 192 equal to one-half the distance moved when the vehicle velocity was set at 35 miles an hour.

The scaling of the output pulse from the scale computer 20 by the vehicle velocity computer 24 is directly dependent upon the position of the switch 126 on the speed scale 132 and accordingly decreases the length of the output pulse from the computer 24 supplied to the sine-cosine cam and switch 30 so that the pointer 202 travels a distance over the map on the plotting board 42 equal to the distance traversed by a vehicle moving at the set speed during one complete cycle of circuit 10. During operation of the computer the bearing $A_t$ of the vehicle may vary so that the direction of the movement of the pointer 202 is correspondingly altered by the operation of the sine-cosine cam and switch 30 and the quadrant switch 40. However, the magnitude of the vector movement of the pointer during each cycle remains directly proportional to the setting of the vehicle velocity computer 24.

The output pulse from the scale computer 20 is fed to the wind or current velocity computer 26 and, as in the vehicle velocity computer 24, is appropriately scaled by computer 26 so that the duration of the output pulse from the wind or current velocity computer has a duration proportional to the velocity of the vehicle due only to wind or current. During the duration of the output pulse from the computer 26 the motor 218 is driven and rotates the stop 224 away from switch 68. When timing motor 54 rotates the cam 58 sufficiently to turn switch 62 off and switch 60 on, the motor 218 will be turned on to rotate the stop 224 back toward switch 68. When the stop hits the trigger of the switch 68 the switch will be turned off and the motor 218 will thereby be deactivated. Since the motor 218 runs in both directions at the same rate of speed, the output pulse from the storage circuit 18, which is communicated to the sine-cosine cam and switch 44 through lead 226, has a duration equal to the duration of the wind or current velocity computer output pulse.

The drift heading input 48, Scotch yoke drive 50, sine-cosine cam and switch 44, motor 46, and quadrant switch 52 are the same as and operate similarly to the previously described units 30 through 40. The sine-cosine cam and switch 44 and quadrant switch 52 are appropriately positioned according to the wind or current bearing $A_w$ so that these computer components will resolve the output pulse from the storage circuit 18 into two components proportional to the north-south and east-west velocity of the vehicle due only to the effect of wind or current. The drive motors 196 and 202 are appropriately switched through quadrant switch 52 so that during the second half of the cycle of circuit 10 the pointer 202 is moved over the map a distance corresponding to the motion of the vehicle due to wind or current during the complete cycle of circuit 10.

The navigation computer as described may be used to plot the position of a moving vehicle on maps or charts of different scales by the proper adjustment of switches 86 and 112 of the scale-computer multiplier 14 and the scale computer 20. As mentioned previously, when the switches 86 and 112 are positioned to connect the lead 64 directly to lead 88 and lead 88 directly to lead 114, the input signal from the cycling circuit 10 is transmitted directly to the vehicle velocity computer and the wind or current velocity computer. When the switches are in this position the computer will trace the position of the vehicle on a map having a scale of 1:5000. By positioning switch 86 so that the lead 64 is connected to lead 88 through switch 78 and positioning switch 112 so that lead 88 remains directly connected to lead 114, cam 70 with a 180° lobe will hold switch 70 in the open position during one-half of the period of the pulse supplied to the scale-computer multiplier 14. The output pulse of the computer 14 therefore has a duration of one-half of the input pulse. Such halved pulse will be provided to the input of the vehicle velocity computer 24 through leads 88 and 114. In this case the pointer 202 on the plotting board 42 will traverse a distance equal to one-half the distance traversed when the full duration pulse from the cycling circuit 10 was applied to the vehicle velocity computer and will accordingly accurately trace the position of the vehicle on a map having a scale of 1:10,000.

If switch 86 is positioned to connect lead 64 to lead 88 through the switch 82, and switch 112 is positioned to connect lead 88 to lead 114 through switch 104, the pulse fed to the vehicle velocity computer and to the wind or current velocity computer has a duration equal to the duration of the cycling circuit pulse 10 which is fed to the scale-computer multiplier 14 multiplied times the reduction factor of the scale-computer multiplier (¼) and also multiplied times the reduction factor of the scale computer (¼). Thus the output pulse has a duration equal to one-sixteenth of that of the cycling circuit pulse. Accordingly, the pointer 202 will move a distance over the plotting board equal to ¹⁄₁₆ of the distance traveled by the pointer if the leads 64, 88 and 114 were connected together by switches 86 and 112 and would accurately plot the position of the vehicle on a map having a scale of 1:80,000. It will be seen that by appropriate positioning of switches 86 and 112, it is possible to plot the position of the vehicle on maps having a variety of scale factors.

The storage circuit 18 is utilized in the computer as described so as to eliminate the necessity of providing additional scale-computer multipliers and scale computers for scaling of the output pulse from the cycling circuit 10 supplied to units 44 and 46 according to the scale of the map on table 42. By use of the storage circuit 18 it is possible to obtain a wind or current velocity computer output pulse and a vehicle velocity computer output pulse from the same scaled output pulse of computer 20 and to then store the wind or current velocity computer output pulse in the circuit 18 until the first half of the cycling circuit has been completed and the plotting board drive motors 196 and 206 are available for actuation to plot vehicle movement due to the effect of wind or current.

In the operation of the computer the position of the pointer 202 at the end of a complete cycle of the circuit 10 may not completely accurately reflect the position of the vehicle on the map since it is possible that one of the pulse dividing or scaling units 14, 20, 24, 26, 30 or 44 would be turned off by the opening of a switch located closer to the power source prior to the completion of an integral number of cycles of the pulse dividing or scaling unit. This type of error is not accumulative and may be reduced to a minimum by providing motors for the time scaling or dividing units which have a rotational speed such that the units are cycled a number of times during each half cycle of the circuit 10. In this way the error in the position of the pointer 202 is reduced and does not materially affect the accuracy of the computer. The effect of such errors is cyclical in time. The maximum error is a function of motor speed. The error reduces periodically to zero throughout the length of time of the navigation run and the frequency of the error cycle is determined by the speed of the motors.

Throughout the specification the word "pulse" is used to define a period of time during which electrical power is supplied to an element of the navigation computer. A "pulse" may be a direct current pulse of given voltage or it may be an alternating current pulse which consists of a single voltage cycle or a number of cycles. The invention may utilize either AC or DC provided, of course, that suitable AC or DC electric motors are used.

While the preferred embodiment of the invention described herein is mechanical in operation and divides the power pulses by means of cams and switches, the invention is not limited to a mechanical type analogue computer. The invention includes electronic time base analogue computers where the pulse dividing or computing is performed by electronic as opposed to mechanical means.

While I have illustrated and described a preferred embodiment of my invention, it is understood that this is capable of modification and I therefore do not wish to be limited to the precise details set forth but desired to avail myself of such changes and alterations as fall within the purview of the following claims.

What I claim as my invention is:

1. An analogue computer comprising computing means capable of performing a multiplicational operation on a timed input signal supplied thereto to form a timed output signal of reduced duration proportional in value to both the value of said input signal and the value of an independently determined input function, signal generating means for supplying an input signal to said computing means, and output means responsive to the output signal of said computing means.

2. A computer for indicating movement of a body, comprising first computing means operable during a first period of time for computing the movement of the body due to a first cause during an interval of time, second computing means operable during a second period of time independent of said first period of time for computing the movement of the body due to a second cause during said interval, each of said periods of time being shorter than said interval of time and occurring during said interval of time, and position indicating means operable by the output of said first and of said second computing means at different times to indicate the total movement of said body during said interval.

3. A computer for indicating the movement of a body, comprising first computing means operable during a first period of time for computing movement of the body due to a first cause during an interval of time, second computing means operable during a second period of time for computing movement of the body due to a second cause during said interval and position indicating means driven by the output of said first computing means and by the output of said second computing means whereby said position indicating means indicates the total movement of the body during said interval due to both said causes.

4. A computer as in claim 3, wherein both said periods of time occur during said interval and said position indicating means is actuated by the outputs of said computing means during said interval.

5. A computer as in claim 3, wherein said periods occur during different portions of said interval.

6. A computer for plotting the movement of a vehicle comprising first computing means operable only during a first period of time for computing the velocity movement of the vehicle during an interval of time, second computing means operable only during a second period of time for computing the drift movement of the vehicle during said interval, and plotting means driven by the output of said first computing means during said first period of time and by the output of said second computing means during said second period of time whereby during said first an dsecond periods of time said plotting means plots the total velocity and drift movement of the vehicle during said interval.

7. A computer as in claim 1 wherein the duration of each of said first and second periods of time is equal to one-half the duration of said interval and said periods are consecutive.

8. A computer as in claim 1 wherein each of said computing means includes a velocity element for providing an element output proportional to a velocity input and a heading element for providing an element output proportional to a heading input, said velocity and heading elements being operably connected to provide a computing means output determined by the velocity and heading inputs.

9. A computer as in claim 9 wherein said velocity and heading elements are positioned in series relation with the output of one element forming the input of the other element and the output of the other element forming said computing means output.

10. A computer as in claim 9 wherein said heading element is positioned between said velocity and computing means.

11. A computer as in claim 1 wherein both said computing means comprise time base analogus computers operable to scale an input signal according to velocity and heading inputs.

12. A computer as in claim 11 wherein said analogue computers are mechanical in operation and each includes velocity and heading elements, each of said elements comprising a lobed cam having a lobe of extent $x$ and a total cam surface of extent $y$, a normally off switch associated with said cam so as to be turned on when engaged with said cam lobe, said switch having one lead forming an element input and the other lead forming an element output, and drive means connected to said one lead for moving said total cam surface past said switch whereby the output signal of each element has a duration equal to the duration of the element input signal multiplied by $x/y$.

13. A computer as in claim 12 wherein the drive means of each of said elements moves its cam uniformly past the associated switch within the same period of time.

14. A computer as in claim 13 wherein said cams are rotary and said drive means comprise electric motors of the constant speed type.

15. A computer as in claim 12 wherein the lobe extent $x$ of each cam is adjustable in accordance with a velocity or heading input.

16. A computer as in claim 1 including adjustable scaling means operable to scale the outputs of said computing means so that by adjustment of said scaling means the plotting means will accurately plot the position of the vehicle on maps or charts of different scale.

17. A computer as in claim 1 including cycling means having a cycle of operation equal in duration to said interval, said cycling means being operable during each cycle thereof to provide a first output signal to activate said first computing means during said first period while deactivating said second computing means, and to provide a second output signal to activate said second computing means during said second period while deactivating said first means.

18. A computer as in claim 17 including adjustable scaling means operable to scale one of said input signals proportionally to the scale of the map or chart on which the vehicle position is plotted by said plotting means, and memory means for storing a signal received from said scaling means and operable in response to the other output signal to supply said stored signal to said second computing means whereby the output of both of said computing means is scaled by said scaling means.

19. Apparatus for plotting the position of a moving vehicle comprising signal means for supplying an output signal, velocity means for reducing the duration of an input signal supplied thereto in proportion to a vehicle velocity input, heading means for resolving an input signal supplied thereto into component signals according to a vehicle heading input, said signals being proportional to the vehicle movement along the axes of the coordinate system of the plotting means, and plotting means for indicating the position of the vehicle on a map or chart and including coordinate indicators for tracing the movement of the vehicle along the axes of a coordinate system, said signal, velocity, heading and plotting means being arranged in series relation with the output signal of the signal means forming the input signal for one of said velocity or heading means, the output signal of such means forming the input signal for the other of said velocity or heading means, and the output signal of the other of said velocity or heading means forming the input signal for said plotting board, the plotting board input signal comprising component signals, each of which is proportional to the vehicle velocity along one of the axes of the coordinate system and each of which is supplied to one of the coordinate indicators to operate the same and plot the position of the vehicle on the map or chart along one of said axes.

20. Apparatus as in claim 19 including adjustable scaling means arranged in series relation between any adjacent two of said signal, velocity, heading and plotting means, said scaling means being operable to scale the signal supplied thereto to form a reduced output signal whereby the plotting means will accurately plot the position of a vehicle on maps or charts of different scale.

21. Apparatus as in claim 19 wherein said plotting means utilizes a north-south and east-west coordinate system and said heading means includes resolution means for resolving the vehicle heading into north-south and east-west components.

22. Apparatus as in claim 19 including drift velocity means for reducing the duration of an input signal supplied thereto in proportion to a drift velocity input and drift heading means for resolving an input signal supplied thereto into component signals according to a vehicle drift heading input, said two means arranged in parallel relation with said velocity and heading means and between said signal means and said plotting means, said signal means adapted to provide said signal to one of said velocity or heading means during a first period of time and to provide a second signal to one of said drift velocity or drift heading means during a second period of time, the output signal of said one of said drift velocity or drift heading means forming the input signal of the other of such means, the output signal of the other of such means forming the input signal of said plotting means during said second period of time whereby during the first period of time said coordinate indicators are driven in response to the output of the other of said velocity or heading means and during the second period of time the coordinate indicators are driven in response to the output of the other of said drift velocity or drift heading means and the total movement of said indicators reflects the total velocity and drift movement of said vehicle.

23. Apparatus as in claim 19 wherein said velocity means is positioned between said signal means and said heading means.

24. Apparatus as in claim 19 wherein each of said velocity means and said heading means includes a lobed cam having a lobe of extent $x$ and a total surface extent $y$, a normally off switch associated with said cam so as to be turned on when engaged with said cam lobe, said switch having one lead forming an input and another lead forming an output, and drive means connected to said one lead for moving said cam relative to said switch, the extent $x$ of the cam lobe being determined by a velocity or heading input, whereby the output signal of each such means has a duration equal to the duration of the input signal thereof multiplied by $x/y$.

25. Apparatus as in claim 24 wherein the drive means of each of said velocity and heading means moves the cam surface of its associated cam past its switch in the same period of time.

26. Apparatus as in claim 25 wherein said cams are rotary and said drive means comprise electric motors of the constant speed type.

27. Apparatus as in claim 19 wherein said plotting means utilizes a rectilinear coordinate system, said coordinate indicators trace vehicle movement in either direction along the axes of said system, and said heading means comprises resolution means operable in response to the heading input giving the vehicle heading input relative to one of the axes of said coordinate system to resolve the input signal supplied to said heading means into component signals, one component signal having a duration equal to the duration of such input signal multiplied by cosine A and the other signal having a duration equal to the duration of such input signal multiplied by sine A. and switching means operable in response to the heading input to connect said component signals to said coordinate indicators so that the coordinate indicators plot the movement of the vehicle in the proper direction along said axes and so that said one signal is connected to the coordinate indicator plotting the movement of the vehicle along said one axis and said other signal is connected to the coordinate indicator plotting movement of said vehicle along said other axis.

28. Apparatus as in claim 27 wherein said resolution means includes a rotatable disc having a pair of diametrically opposed pins each positioned an equal distance from the center of the disc, means for rotating the disc in response to the vehicle heading input, a slidably mounted bar positioned perpendicular to the axis of the disc and perpendicular to the diameter of the disc joining said pins when the vehicle heading is along one of said coordinate system axes, said bar including a flat cam face perpendicular to the axis of movement of said bar and engageable with one or both of said pins, means biasing said bar toward said pins so as to bring said face into engagement with one or both of said pins, spaced sensing means carried on the bar remote from said disc and each having an input and an output lead, a pair of cylindrical cams positioned adjacent the remote end of said bar with their axes parallel to the axis of the bar, each cam being engageable with one of said sensing means and having an axial height equal to the maximum throw of said bar, the circumferential lobe extent of one of said cams increasing linearly from 0% at the end thereof adjacent said disc to 100% at the end remote from said disc and the circumferential lobe extent of the other of said cams decreasing from 100% at the end adjacent said disc to 0% at the end remote from said disc according to a trigonometric function, drive means for rotating said cams past said sensing means to bring the lobes thereof into engagement with said sensing means powered by the input signal supplied to said heading means, each sensing means input lead connected to receive such input signal, the output lead of each of said sensing means connected to said switching means whereby the position of the sensing means relative to the cam is determined by the throw of the bar and the output signal of each sensing means is equal in duration to the duration of the input signal supplied to said heading means multiplied by the circumferential lobe extent of the cam swept by said sensing means.

29. Apparatus as in claim 27 wherein each coordinate indicator has two input leads, one lead for plotting vehicle movement in each direction along the coordinate axis of said indicator and wherein said switching means includes a cam, means for rotating said cam in response to the vehicle heading, first and second switching units each including an input lead and two output leads, said first switching unit being engageable with said cam to connect its input lead to one of its output leads when the heading of the vehicle is in one of two adjacent quadrants located to either side of said one of said axes, and to connect its input lead to the other of its output leads when the heading of the vehicle is not in such quadrants, said second switching unit being engageable with said cam to connect its input lead to one of its output leads when the heading of the vehicle is in one of two adjacent quadrants located to either side of the other of said axes, and to connect its input lead to the other of its output leads when the heading of said vehicle is not in such quadrants, the input leads of said first and second switching units being connected to receive the one component output signal and the other component output signal respectively, the output leads of said first switching unit being connected to the input leads of the coordinate indicator for said one axis and the output leads of said second switching unit being connected to the input leads of the coordinate indicator for said other axis whereby the direction of movement of the coordinate indicators along their axes during the plotting of vehicle movement on the plotting means is determined by the quadrant in which the vehicle heading lies.

30. An analogue computer for performing a plurality of operations comprising a plurality of series oriented computing means, each computing means capable of performing a multiplicational operation on a timed input signal supplied thereto to form a timed output signal of reduced duration proportional in value to both the value of said input signal and the value of an independently determined input function, signal generating means for supplying an input signal to the first of said computing means, and output means responsive to the output signal of the last of said computing means.

31. A computer as in claim 30 wherein each computing means is mechanical in operation and at least one of such means is continuously adjustable to reduce the duration of the input signal supplied thereto in proportion to the input function.

32. A computer as in claim 30 wherein each of said computing means is mechanical in operation and one of said computing means performs a trigonometric operation on the input signal supplied thereto.

33. A computer as in claim 30 wherein each of such computing means is mechanical in operation and includes a lobed cam having a lobe of extent $x$ and a total cam surface of extent $y$, a normally off switch associated with said cam so as to be turned on when engaged with said cam lobe, said switch having one lead forming a computing means input and another lead forming a computing means output, and drive means connected to said one lead for moving said total cam surface past said switch whereby the output signal of each computing means has a duration of the input signal multiplied by $x/y$.

34. A computer as in claim 33 wherein the drive means of each of said computing means moves its cam uniformly past the associated switch within the same period of time.

35. A computer as in claim 34 wherein said cams are rotary and said drive means comprise electric motors of the constant speed type.

36. A computer as in claim 35 wherein the lobe extent $x$ of each cam is adjustable in accordance with the input function.

37. Apparatus for indicating the position of a moving body comprising signal means for supplying a timed input signal, means for supplying a body velocity input signal, time base analogue body velocity computing means for forming a velocity output signal by reducing the duration of said signal means input signal in proportion to said body velocity input signal, and output means activated by said velocity output signal to indicate the position of the body.

38. Apparatus as in claim 37 including scaling means operative to reduce the duration of said velocity output signal in proportion to a scale input whereby the position of the body may be indicated on maps or charts of different scale.

39. The method of performing a mathematical operation comprising the steps of providing during a period of time an input signal having a value proportional to its total duration during said period and reducing the duration of said signal during said period of time proportionally to the value of a multiplicational operator, such operator value being less than one, to form an output signal having a total duration proportional to the value of said input signal and of said operator.

40. The method of claim 39 including the step of providing a plurality of signal pulses in said input signal and reducing the duration of at least one of said input signal pulses to form said output signal.

41. The method of claim 39 including the step of reducing the duration of said output signal proportionally to the value of a second operator to form a second output signal having a total duration proportional to the value of said input signal and to the value of both said operators.

(References on following page)

References Cited

UNITED STATES PATENTS

| | | | | |
|---|---|---|---|---|
| 2,584,267 | 2/1952 | Hayek | 235— | 150.27 |
| 2,936,940 | 5/1960 | Parsons | 235— | 61 |
| 2,959,347 | 11/1960 | Kearns | 235— | 61 |
| 3,060,409 | 10/1962 | Daniels | 235— | 150.4 |
| 3,092,432 | 6/1963 | Fryklund | 346— | 8 |
| 3,231,723 | 1/1966 | Gilliland et al. | 235— | 150.4 |
| 3,278,926 | 10/1966 | Wiley et al. | 346— | 29 |
| 3,333,187 | 7/1967 | Whitfield | 324— | 68 |

RICHARD B. WILKINSON, Primary Examiner

S. A. WAL, Assistant Examiner

U.S. Cl. X.R.

235—150.2; 346—8

PO-1050
(5/69)

UNITED STATES PATENT OFFICE
CERTIFICATE OF CORRECTION

Patent No. 3,532,267      Dated October 6, 1970

Inventor(s) LEO W. TOBIN, JR.

It is certified that error appears in the above-identified patent and that said Letters Patent are hereby corrected as shown below:

Claims 7, 8, 11, 16 and 17, line 1, after "claim" the numeral "1" should read -- 6 --.

Claim 9, line 1, after "claim" the numeral "9" should read -- 8 --.

SIGNED AND
SEALED
DEC 29 1970

(SEAL)
Attest:

Edward M. Fletcher, Jr.
Attesting Officer

WILLIAM E. SCHUYLER, JR.
Commissioner of Patents